US 6,543,715 B1

(12) United States Patent
Karpov et al.

(10) Patent No.: US 6,543,715 B1
(45) Date of Patent: Apr. 8, 2003

(54) AEROSPACE SYSTEM

(75) Inventors: Anatoly Stepanovich Karpov, ulitsa Kropotkina, d.1, kv.128, 394030 Voronezh (RU); Vladimir Sergeevich Rachuk, ulitsa Sredne-Moskovskaya, d.69, kv.125, 394030 Voronezh (RU); Robert Konstantinovich Ivanov, ulitsa Semashko, d.26, korpus 1, kv. 204, 141014 Moskovskaya oblast, Mytischi (RU); Jury Vladimirovich Monakhov, Korolev (RU); Mikhail Markovich Kovalevsky, Moscow (RU); Andrei Vladimirovich Borisov, Korolev (RU)

(73) Assignees: Anatoly Stepanovich Karpov, Vorenezh (RU); Vladimir Sergeevich Rachuk, Voronezh (RU); Robert Konstantinovich Ivanov, Moskovskaya oblast (RU)

( * ) Notice: Subject to any disclaimer, the term of this patent is extended or adjusted under 35 U.S.C. 154(b) by 0 days.

(21) Appl. No.: 10/048,179
(22) PCT Filed: Jul. 29, 1999
(86) PCT No.: PCT/RU99/00261
  § 371 (c)(1),
  (2), (4) Date: Jan. 29, 2002
(87) PCT Pub. No.: WO01/08975
  PCT Pub. Date: Feb. 8, 2001

(51) Int. Cl.7 .................................................. B64D 1/00
(52) U.S. Cl. ............................ 244/2; 244/63; 244/137.1
(58) Field of Search ........................... 244/2, 63, 137.1, 244/172

(56) References Cited

U.S. PATENT DOCUMENTS 4,697,764 A   10/1987  Hardy et al.
4,901,949 A   2/1990   Elias
5,257,758 A   11/1993  Hassel (List continued on next page.)

FOREIGN PATENT DOCUMENTS

RU   2026798   3/1989

(List continued on next page.)

OTHER PUBLICATIONS

William B. Scott, Aviation Week & Space Technology, Jan. 11, 1999, p. 444.

Primary Examiner—Robert P. Swiatek
(74) Attorney, Agent, or Firm—Burns, Doane, Swecker & Mathis, L.L.P.

(57) ABSTRACT

An aerospace system, which comprises a carrier aircraft, a launch vehicle and a payload. The launch vehicle with liquid fuel propulsion units is placed inside a fuselage of the carrier aircraft within a transport and launch container with the aid of support units in at least in two areas, an airtight pneumatic chamber is formed between the blind end of the transport and launch container and the end of the launch vehicle, which chamber incorporates airborne elements of units for supplying the launch vehicle with propellant and working mediums, elements of a draining unit, elements of a unit for replenishing the liquid fuel propulsion units with propellant, electrical connections, wherein all the units, electrical connections and airborne elements are connected to the end of the launch vehicle by pull-off couplings, wherein the transport and launch container is provided with a pneumatic ejection unit, made in the form of a high pressure source connected by stop valves to the pneumatic chamber and positioned in the transport and launch container, provided with thermal insulation, wherein the diameter of the free end the container, provided with a frangible membrane, is hermetically connected to the perimeter of the port in the fuselage of the carrier aircraft. The proposed system makes it possible to enhance payload capacity and to reduce the specific cost of putting a payload in orbit, to provide a high degree of safety for the carrier aircraft and its crew, and also to ensure ecological safety of the system.

1 Claim, 1 Drawing Sheet

U.S. PATENT DOCUMENTS

| | | | |
|---|---|---|---|
| 5,279,199 A | | 1/1994 | August |
| 5,295,642 A | * | 3/1994 | Palmer .................... 244/158 R |
| 5,402,965 A | | 4/1995 | Cervisi et al. |
| 5,626,310 A | * | 5/1997 | Kelly ..................... 244/158 R |
| 5,740,985 A | * | 4/1998 | Scott et al. .............. 244/137.4 |
| 6,260,802 B1 | * | 7/2001 | Hampsten ................ 244/137.1 |

FOREIGN PATENT DOCUMENTS

| | | |
|---|---|---|
| RU | 2061630 | 6/1996 |
| RU | 2068169 | 10/1996 |
| RU | 2120398 | 10/1998 |
| RU | 2129508 | 4/1999 |

* cited by examiner

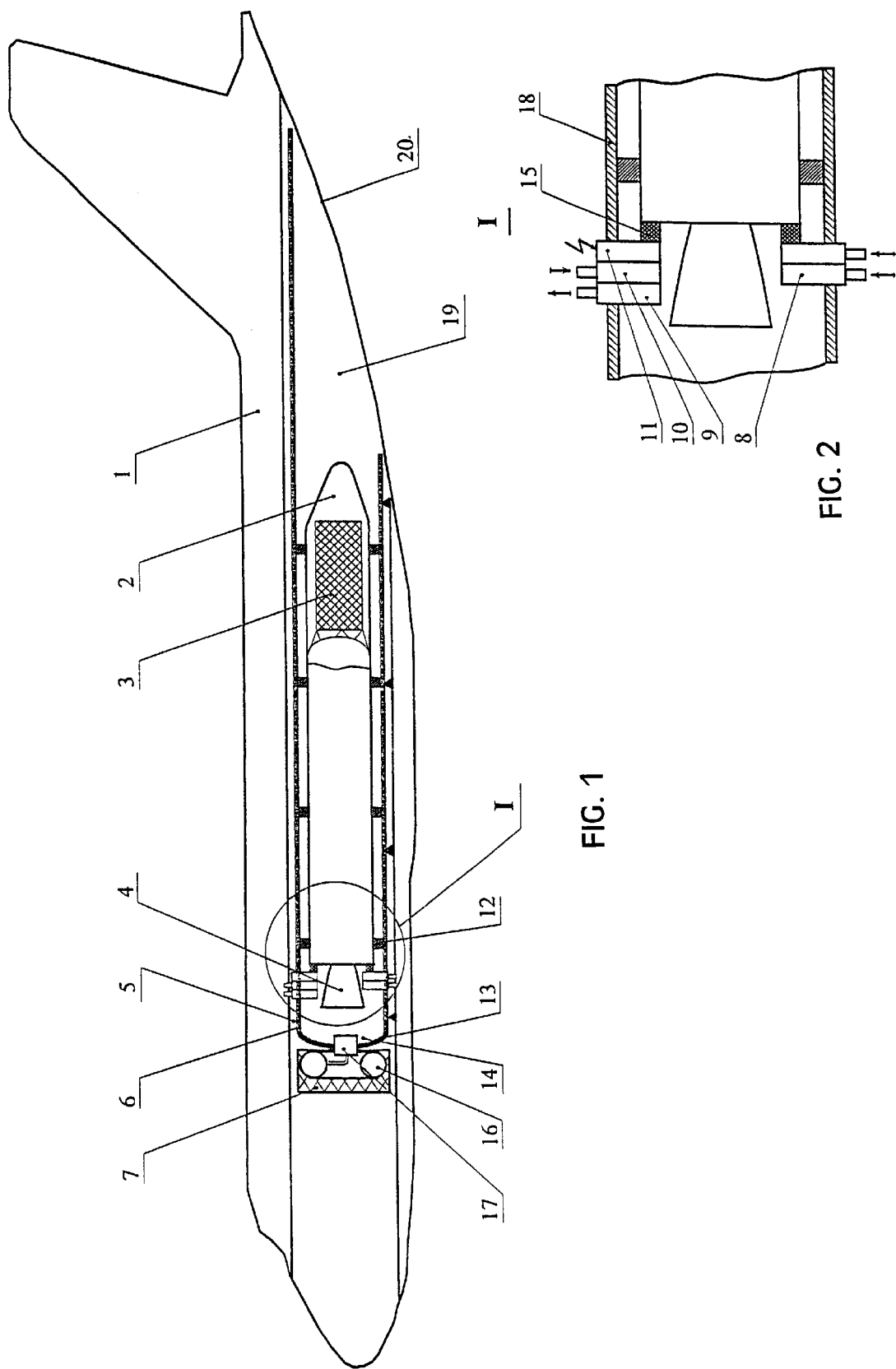

AEROSPACE SYSTEM

FIELD OF THE INVENTION

The invention relates to aerospace technology and canl be used, in particular, to place different payloads, such as communication, navigation, monitoring satellites (including ecology monitoring satellites), and scientific instruments, into low and medium earth orbits, as well as to promptly deliver payloads to remote terrestrial and oceanic areas.

BACKGROUND OF THE INVENTION

According to estimates of Euroconsult, a European firm, it will be necessary within the period of 2000–2015 to place about 1800 satellites in accordance with more than 200 projects into earth orbits at an altitude of up to 3000–5000 km with different inclinations. The launch service market potential will add up to about 15–20 billion USD.

A continuing demand for light-class launch vehicles has brought about development activities in the U.S.A., Germany, Great Britain, Ukraine, Russia, Japan and China.

The U.S.A.-developed Pegasus Aerospace System with a payload capacity of about 450 kg is currently in operation in the USA, development of the Oril project is under way in the Ukraine, and the SHTIL-3A and Burlak-Diana projects are being developed in Russia.

In the Oril and SHTIL-3A projects, the launch vehicles are based on ICBM-class rockets with the toxic AT-NDMT propellant and this does not ensure ecologically safe operation.

Aerospace systems are known for piggyback-launcling of vehicles such as launch vehicles or small-size orbiters from a carrier aircraft (RU Pat. No. 2061630, IPC$^6$ B64G 1/14).

A drawback of such systems is the necessity of firing rocket engines to depart from the carrier aircraft, which is extremely dangerous in the case of a launch vehicle's launch failure.

The Burlak-Diana project (Aviation Week and Space Technology, U.S.A., Jan. 11, 1999, p.444) and the German Daimler-Benz Aerospace P.G. project (RU Pat. No. 212039S.IPC$^6$ B64G 1/14) employ a winged launch vehicle suspended under the fuselage or wing of a carrier aircraft.

Drawbacks of these projects are the launch vehicle diameter limitations which are determined by the available space between a carrier aircraft's bottom surface and the runway as well as the necessity to equip the launch vehicle with airfoils to perform an ascent maneuver after horizontal separation of the launch vehicle from the carrier aircraft.

A Rockwell International Corporation aerospace system is known (U.S. Pat. No. 5,402,965. IPC$^6$ B64G 1/14), which comprises a carrier aircraft and a ventral launch vehicle mated with a recoverable orbiter (payload). The system provides for horizontal runway takeoff, delivery of the payload-carrying launch vehicle to the launch vehicle—carrier aircraft separation point, injection of the payload into target orbit by the launch vehicle, and release of the payload with its subsequent return to Earth.

A technical Solution is also known according to RU Pat. No. 202679S, 1PC$^6$ B64D 5/00 (Orbital Science Corporation, which is a launch vehicle dropped from a carrier aircraft and containing power stages, a wing and payload.

Drawbacks of the aforesaid technical solutions according to U.S. Pat. No. 5,402,965 and RU Pat. No. 2026798 repeat the drawbacks of the Burlak-Diana system described above and furthermore they make system control more complicated as a result of the need to ensure flight control both during winged aerodynamic flight and during jet flight.

The analog most similar to the present invention is the Pegasus Aerospace System according to U.S. Pat. No. 4,901,949, IPC$^6$ B64G 1/14, comprising a carrier aircraft, launch vehicle with powder engines, wing and payload.

Drawbacks of this system are the aforesaid limitations in respect to the diameter of the launch vehicle suspended under the carrier aircraft, the presence of a wing on the launch vehicle to gain height after horizontal separation from the carrier aircraft, a more complex control system (for two modes: winged aerodynamic flight and jet flight), and also, as a result, a low payload capacity of this system and a high specific cost of the injected payload.

DISCLOSURE OF THE INVENTION

The object of the present invention is to enhance the payload capacity of an aerospace system, to reduce the specific cost of payload injection, to enlarge the payload envelope, and, simultaneously, to ensure carrier aircraft and crew safety and to provide ecological safety of the system.

This object is accomplished in that in an aerospace system comprising a carrier aircraft, a launch vehicle and a payload, the launch vehicle with liquid-fuel propulsion units is placed inside the fuselage of the carrier aircraft within a transport and launch container fitted with a pneumatic ejection unit, airborne elements of units for supplying the launch vehicle with propellant and working mediums, elements of units for draining and for replenishing the liquid-fuel propulsion units with propellant.

The launch vehicle is mounted in the transport and launch container by support units in at least in two areas, and an airtight pneumatic chamber is formed between the end of the launch vehicle and the blind end of the container, which chamber incorporates the airborne elements of the aforesaid units for supplying, draining and replenishing, which are connected to the end of the launch vehicle by pull-off couplings, wherein the pneumatic ejection unit is made in the form of a high pressure source connected to the pneumatic chamber of the container by stop valves, which chamber is provided with thermal insulation. The free end of the container coincides with a port in the fuselage of the carrier aircraft and is hermetically connected to the perimeter of the point, wherein the free end of the container is provided with a frangible membrane.

BRIEF DESCRIPTION OF THE DRAWINGS

FIG. 1 shows a longitudinal cross section of the aerospace system of the invention.

FIG. 2 shows the details of the circled area I in FIG. 1.

DETAILED DESCRIPTION

The proposed aerospace system is shown in FIG. 1, where:
- 1—carrier aircraft (CA);
- 2—launch vehicle (LV);
- 3—payload (PL);
- 4—liquid-fuel propulsion units (LFPU);
- 5—carrier aircraft fuselage;
- 6—transport and launch container;
- 7—pneumatic ejection unit;
- 8—airborne elements of units for supplying the LV with propellant and working mediums;

9—elements of draining unit;
10—elements of LFPU propellant replenishment unit;
11—electric Couplings;
12—Support units;
13—blind end of transport and launch container;
14—pneumatic chamber;
15—pull-off couplings;
16—high pressure source:
17—stop valves;
18—thermal insulation;
19—free end of transport and launch container;
20—frangible membrane.

The proposed aerospace system comprises a carrier aircraft 1 and a launch vehicle 2 incorporating liquid-fuel units 4 and a payload 3

The launch vehicle 2 is installed, by means of support units 12 mounted in at least two areas of the LV 2, in a transport and launch container 6 located inside a fuselage 5 of the carrier aircraft 1.

The transport and launch container 6 contains a pneumatic ejection unit 7 made in the form of a high pressure source 16.

An airtight pneumatic chamber 14 is formed between blind end 13 of the transport and launch container and the end of the launch vehicle, which chamber contains airborne elements of unit 8 for supplying the launch vehicle 2 with propellant and working mediums, elements of draining unit 9, and elements of LFPU propellant replenishment unit 10, which are connected to the end of the launch vehicle 2 by pull-off couplings 15. The high pressure source 16 is connected to the pneumatic chamber 14 by stop valves 17.

The transport and launch container 6 is fitted with thermal insulation 18 as seen in FIG 2. Free end 19 of the transport and launch container 6 is closed with a frangible membrane 20 coincident with a port for ejecting the LV 2 from the CA 1. The free end 19 is hermetically connected to the perimeter of the port in the fuselage 5 of the CA 1

The transport and launch container 6, in addition to fulfillment of the function of ejection of the LV 2, also serves for loading the LV 2 therein at a field assembly area, for transporting to and loading into the CA 1, serves to protect the LV 2 from external mechanical and environmental effects. The container's thermal insulation 18 is used for thermal stabilization of the LFPU 4 propellant tanks.

The pneumatic ejection unit 7 serves to eject the LV 2 From the transport and launch container 6 positioned inside the Fuselage of the CA 1. The pneumatic ejection unit 7 contains a higher pressure source 16 with stop valves 17 and the airtight pneumatic chamber 14 formed by the blind end 13 of the transport and launch contained and the end of the LV 2 with support units 12. The airborne elements 8 of units for supplying the LV with propellant and working mediums may be made in the form of pipes fitted with stop valves and pull-off couplings. The airborne elements 8 are intended for fueling the LFPU 4 propellant tanks at the base aerodrome and for filling the systems of the LV 2 with working, mediums prior to takeoff of the CA 1.

Elements of the draining unit 9 are mounted in the pneumatic chamber 14 and serve to jettison propellant components'vapors, such as cryogenic vapors, from the LFPU 4 propellant tanks to outside the aircraft, both during prelaunch preparation and during flight of the aircraft. Elements of tie LFPU propellant replenishment unit 10 serve to refuel the LFPU propellant tanks both during the CA 1 prelaunch preparation and during the flight up to ejection of the LV from the container.

Positioning the airborne elements of the units for supplying the LV with propellant and working mediums, elements of the draining units, and elements of the LFPU propellant replenishment unit, as well as their connections to the LV within the pneumatic chamber are necessary for their disconnection from the LV by movement of the LV, which simplifies the disconnection scheme and improves system reliability.

Sealing the free end 19 of the transport and launch container around the perimeter of the port in the fuselage 5 of the CA makes it possible during ejection of the LV therefrom to insulate the inner space of the fuselage, where the accompanying service personnel are, and thus to protect the personnel against possible dangerous environmental effects.

The aerospace system functions in the following manner.

The carrier aircraft 1 (e.g. an AN-124-100 heavy cargo aircraft) with a launch vehicle 2 on board takes off from the base airfield and flies to the desired LV launching area (e.g. an equatorial area).

In the LV 2 launching area, the carrier aircraft 1 maneuvers to capture a near zerogravity trajectory (weightlessness section). In that section when the design parameters corresponding to initiation of the LV 2 launch are attained, e.g. altitude 10–12 km, trajectory pitch angle—15–25, flight speed—650–750 km/ih, the command is issued to activate the pneumatic ejection unit 7 and to open stop valves 17 of the high pressure source 16, from which gas is supplied to the pneumatic chamber 14. When the gas in the pneumatic chamber 14 reaches a superpressure value, e.g. a pressure of about 1 atm, LV 2 With Support units 12 disengages from the transport and launch container 6 and, under gas pressure, the LV 2 begins to exit from the free end 19 of the transport and launch container 6, with the frangible membrane 20 being disrupted by movement of the LV. At the same time, movement of the LV 2 disconnects the pull-off couplings 15, disengaging the airborne elements of units for supplying the LV with propellant and working mediums 8, draining unit 9, LFPU propellant replenishment unit 10, and electric couplings 11.

During an estimated time, e.g. 1.5–2.5 s, the LV 2 exits from the carrier aircraft fuselage 5 and then performs unpowered flight for a time ensuring movement of the LV 2 away from the CA 1 to a safe distance, e.g. 150–200 m.

Then the LFPU 4 of the LV 2 is ignited and the LV performs its mission to insert the payload 3 into scheduled orbit.

The present invention makes it possible:

to enlarge the zone for accommodation of payloads by employing a fuselage of considerably greater volume, e.g. AN-124-100 Ruslan, as compared with the space between a carrier aircraft's bottom surface and the runway in all known systems, the Pegasus system included;

to enhance payload capacity and to reduce the specific cost of putting a payload into orbit. For instance, when an AN-I24-100 Ruslan is employed as the carrier aircraft, the cost of putting a one kg payload into orbit is 5–6 times less than when the Pegasus system is used. This is achieved by installing the LV in the transport and launch container and by the pneumatic ejection unit which makes it possible to eject the LV under near-weightlessness conditions;

to provide a high degree of safety for the CA and the crew members thereof by firing the LV's LFPU at a considerable distance from the CA, which is possible due to the fact that the LV has been given an initial speed impulse during ejection, as well as by the fact that the crew members are insulated against environmental effects while the LV is being ejected from the CA;

to ensure the ecological safety of the system by the possibility of employing an LFPU operating on pollution-free propellant components, e.g. LOX/kerosene or LOX/liquefied natural gas.

Industrial Applicability

The present invention may be realized With the use of currently available aircraft, e.g. AN-124-100 Ruslan or AN-225 Mria. Using currently available LPF engines, e.g. NK-33, NK-43, RD-0124, 11D58M, as well as launch vehicles produced by well-developed manufacturing technologies, makes it possible to create a launch vehicle for the proposed aerospace system in the shortest possible time and at minimum cost.

The transport and laulicil container fitted with a pneumatic ejection unit of the proposed design is made in accordance with known technologies and with the use of, among other things, off-the-shelf component parts.

What is claimed is:

1. An aerospace system comprising a carrier aircraft, a launch vehicle and a payload, wherein the launch vehicle with liquid fuel propulsion units is placed inside a fuselage of the carrier aircraft within a transport and launch container with thermal insulation with the aid of support units in at least in two areas, an airtight pneumatic chamber is formed between a blind end of the transport and launch container and an end of the launch vehicle, which chamber incorporates airborne elements of units for supplying the launch vehicle with propellant and working mediums, elements of a draining unit, elements of a unit for replenishing the liquid fuel propulsion units with propellant, wherein all said draining and replenishing units electrical connections and airborne elements are connected to the end of the launch vehicle by pull-off couplings, wherein the transport and launch container is provided with a pneumatic ejection unit of the launch vehicle, made in the form of a high pressure source connected by stop valves to the pneumatic chamber and positioned in the transport and launch container, the other—free end of which is closed with a frangible membrane and is hermetically connected to the perimeter of the port in the fuselage for exit of the launch vehicle from the carrier aircraft.

* * * * *